United States Patent

[11] 3,633,494

| [72] | Inventors | Heinz Schippers<br>Remscheid;<br>Hans Siemetzki, Hilgen, both of Germany |
|---|---|---|
| [21] | Appl. No. | 39,020 |
| [22] | Filed | May 20, 1970 |
| [45] | Patented | Jan. 11, 1972 |
| [73] | Assignee | Barmag Barmer Maschinenfabrik<br>Aktiengesellschaft<br>Wuppertal, Germany |
| [32] | Priority | May 28, 1969 |
| [33] | | Germany |
| [31] | | P 19 27 067.8 |

[54] SCREW EXTRUDERS WITH BAFFLE PLATES AND EXPELLER BODIES
10 Claims, 4 Drawing Figs.

[52] U.S. Cl. .................................................. 100/90,
100/145, 425/203, 425/208
[51] Int. Cl. .................................................... B29f 3/02,
B29f 3/03

[50] Field of Search............................................ 18/12 SM,
12 SV, 12 SH, 12 SN, 30 HH, 30 FM, 30 FH;
221/75; 222/412, 4 B; 100/145, 150

[56] References Cited
UNITED STATES PATENTS

| 3,047,034 | 7/1962 | Sassmannshausen et al. | 18/12 SH UX |
|---|---|---|---|
| 3,310,617 | 3/1967 | Dygert et al. ................... | 18/12 SH X |
| 3,417,968 | 12/1968 | Schlecht........................ | 18/12 SH X |

*Primary Examiner*—J. Spencer Overholser
*Assistant Examiner*—Norman E. Lehrer
*Attorney*—Johnston, Root, O'Keeffe, Keil, Thompson & Shurtleff ABSTRACT: The screw extruder for the processing of liquid melts or pulverulent, granular or similar thermoplastic materials, especially of those with liquidlike flow behavior, wherein the feed hopper of the screw press has at least one stationary, vertically adjustable, radial baffle plate and also one or more expeller bodies inside a spiral impeller revolving in the annular space between a conical segment of the hopper and the baffle plates and expeller bodies.

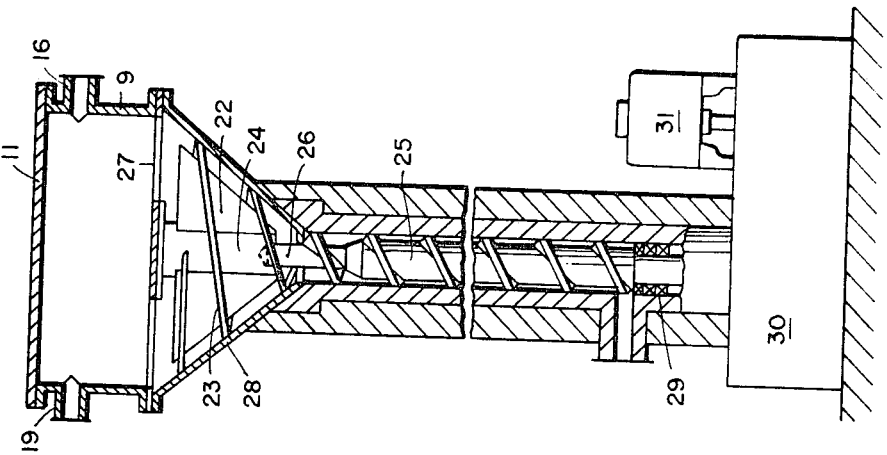
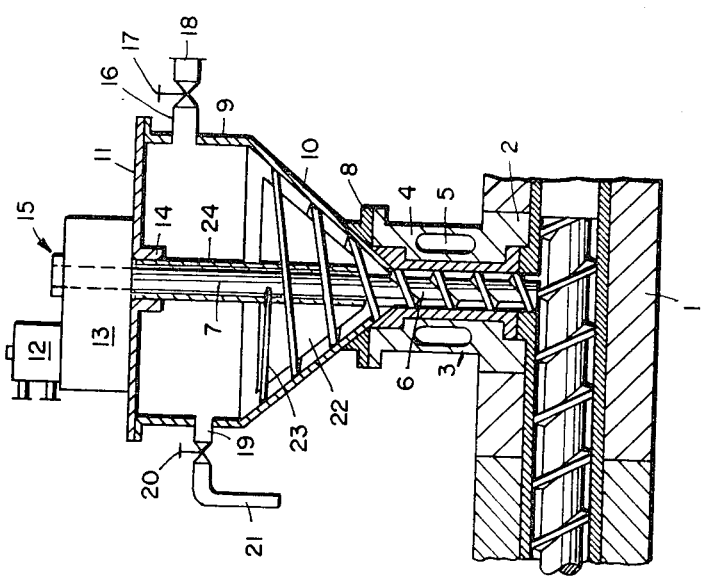

INVENTORS:
HEINZ SCHIPPERS
HANS SIEMETZKI
BY: Johnston, Root, O'Keeffe, Keil, Thompson & Shurtleff
ATT'YS

SCREW EXTRUDERS WITH BAFFLE PLATES AND EXPELLER BODIES

In the processing of thermoplastic substances in screw extruders, feed of the substances into the extruder presents difficulties. The individual particles, as a consequence of their liquidlike flow behavior, evade engagement by the screw. For improving the feed characteristics of such screw extruders, one approach involves the provision in the filling zone of the screw an entry pocket which runs in the axial direction of the extrusion cylinder in the closed part of the chamber. The pocket has its greatest cross section at the entry opening, extends a length equal to at least a single screw pitch, and merges into the circular cross section of the screw cylinder (Swiss Pat. No. 427,241). For the improvement of the efficiency of such entry pockets, a further modification has an adjustable choke member, with which the effective filling volume of the entry pocket can be varied. The choke member may be, for example, a plate, which can be fixed or may be adjustable (Swiss Pat. No. 446,707).

Experiments as well as practical experiences in operation have shown that the arrangement of such an entry pocket with choke member can increase the screw feed performance of a given screw press, e.g., with low-pressure polyethylene, by 100 percent and more. Thus it is possible to increase the performance of a horizontally arranged extruder with 60 mm. screw diameter and a screw length of 24 $D=1,440$ mm. from 10 to 20 kg./hr. to 30 to 55 kg./hr. in the case of low-pressure polyethylene powder. Similar increases also can be achieved with polystyrene.

Despite the appreciable improvement of the screw feed performance of screw extruders, however, such types of plastics, now as before, still present certain problems, particularly the highly fluid varieties. The most serious difficulties are presented by liquids, for example liquid melts, which are likewise processed in such worm presses.

In order to facilitate the feed of finely powdered thermoplastic substances in worm presses and thereby improve the screw feed or entry performance, it is further a known practice to engage on input side of a horizontally arranged worm press a short vertically disposed feed screw. This feed screw consists of a short feed screw flight rotating in a correspondingly dimensioned tubular shell, as well as a funnel-shaped filling shaft following thereupon for the finely powdered thermoplastic material. The filling screw extends vertically through the lower part of the funnel-shaped filling shaft. On the vertical drive shaft there are mounted paddle-type blades, which are inclined at a slight angle to the horizontal (British Pat. No. 997,608). Through this arrangement, rotation of the shaft and thereby of the paddles accelerates downwardly the powder particles present in the filling shaft in the direction toward the filling screw. The action of such paddles, however, remains relatively slight, since, in particular, particles with very low mutual friction as well as liquids can flow easily around the blades and in so doing, instead of flowing downward in the desired direction, move in a concentric circular path. This effect is all the more pronounced as the paddles become more inclined with respect to the horizontal.

THE INVENTION HEREIN

With this state of technology there exists the problem of providing a screw press for the processing of powder-form, granule-form or similar thermoplastic materials, especially of those with a liquidlike flow behavior, and also for the processing of liquid melts, in which, despite the low friction between the individual particles, the screw feed or entry performance is considerably increased.

According to the invention this problem is solved by means wherein, in the feed or entry shaft of the screw extruder, there is arranged at least one radially extending, stationary baffle plate means within a spiraliform or helical impeller member, which conforms to the shape of the feed hopper and which orbits around the baffle plate means. The feed hopper and the baffle plate or plates arranged in it, as well as the impeller member, should be tapered in conical or funnel shape, at least in the lower zone of the hopper. It has also proved advantageous when the helical impeller member is secured to the vertical feed screw and is driven in common with it. Instead of a baffle plate which extends through the feed hopper radially, several radial baffle plates advantageously can be secured to a common, central, support tube, through which extends the vertical drive shaft for the feed screw and the spiraliform or helical impeller.

The combination according to the invention is superior to those known hitherto in that, through the presence of stationary baffle plate means in the interior of the impeller member, the escaping of the fine particles of liquid as they are engaged by the revolving impeller and pressed downward, as well as an orbiting of the composition to be conveyed in the interior of the feed hopper, is avoided. In its revolution, the impeller's spiral or helix imparts to the particles or liquid directly thereunder a downward acceleration in the direction of the discharge opening of the feed hopper. In their downward movement, the particles naturally strike the next turn of the spiral or helix below or the funnel-shaped inclined wall of the hopper and undergo in the process a deflection of their direction of movement toward the axial center of the hopper. Furthermore, the particles are driven simultaneously into a concentric, circular or orbital movement. They strike against the stationary baffle plates or walls disposed in the interior of the spiral, are deflected off the stationary surfaces, and in this manner constantly pass back into the zone of influence of the revolving spiral or helix, where they are again engaged and conveyed downward. Tests have shown that through this arrangement in screw feed or entry performance of an extruder which is comparable with the above-mentioned combination and which has a worm diameter of 60 mm. with a worm length of 17 $D=1,020$ mm. it was possible to increase the feed rate of low-pressure polyethylene powder from 102 to 135 kg./hr.

Further increase of the entry performance is possible if in the spaces or voids between the stationary walls or plates and the impeller are substantially filled by at least one, preferably vertically adjustable, expeller body. This adjustable expeller body makes it possible to shorten at will the path which the powder particles or liquid can move in radial direction and to adjust it to the most favorable value. In this manner, the performance of the combination according to the invention can be adapted optimally to various types of powders or melts.

THE DRAWINGS

Preferred embodiments of the invention are explained in detail in connection with the drawings, wherein:

FIG. 1 is a longitudinal section through a first embodiment of the invention, in which the spiral or helical impeller and the stationary plates or walls are disposed in a gas-evacuable hopper of a vertical filling horizontal screw extruder;

FIG. 2 is a longitudinal section through another embodiment in which the stationary walls or plates and the spiral impeller are provided in the gas-evacuable hopper of a vertical screw extruder;

THE ILLUSTRATED EMBODIMENTS

Figure 4:
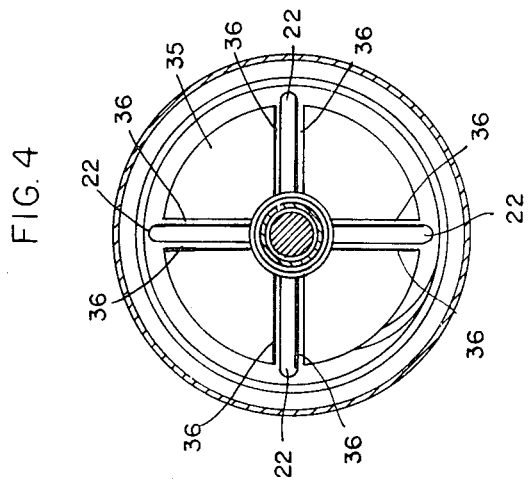
FIG. 4 is a cross section along section plane 4—4 of FIG. 3.

In FIG. 1 a part of a horizontal screw extruder 1 is represented, in the feed opening 2 of which there is mounted a vertical filling or feed extruder 3. The filling or feed extruder 3 consists essentially of the tubular extruder shell 4, in which there can be situated hollow spaces 5 for the passage of a cooling fluid. In the interior of the extruder shell 4 there is situated the rotatable extruder worm or screw 6, the upper part of which is the drive shaft 7.

On the upper end of the extruder shell 4 there is mounted, for example, by means of a flange 8, the feed hopper 9, which is tapered in conical or funnel form in its lower portion 10. The hopper 9 is represented in the illustrated embodiment as a gas-evacuable, closed vessel, whose cover serves as the carrier for the drive motor 12 and the gear box 13. The drive motor 12 is preferably a hydraulic motor. The drive shaft 7 extends vertically through the hopper 9 and via a stuffing box 14 through the cover 11 and into the gear box 13. In the gear box 13 the shaft 7 is journaled in a manner whereby it is vertically adjustable. Its vertical position can be adjusted by conventional means 15.

The hopper 9 has, further, vacuum pipe 16 and a valve 17 with a flange 18 to which is connected a vacuum line (not shown). With this arrangement the hopper 9 can be connected to a vacuum pump (not shown) whereby it is possible to evacuate to a substantial degree the interior of the hopper 9 and thereby to achieve two things.

In the first place, finely pulverized thermoplastic bulk material which is to be processed can be freed of superficially adhering gases. This is important in order to generate a bubblefree melt in the main extruder 1. In the second place, the subpressure prevailing in the hopper 9 can also be utilized for sucking the thermoplastic pulverument material to be processed into the hopper 9. For this there is located on the hopper 9 another pipe 19, which is connected via the valve 20 to the filling line 21.

According to the invention there is situated in the interior of the hopper 9 at least one radial baffle wall or plate 22, as well as a spiral or helical impeller member 23 preferably conforming substantially with the shape of the contiguous part of the hopper and surrounding and orbiting about the baffle wall or plate 22. The impeller rotates together with the extruder worm or screw 6. In order to make this possible, the impeller 23 is connected fixedly with the worm or screw 6.

The baffle members 22, of which as a rule there are two diametric pairs of plates or walls arranged in the form of a cross — see FIG. 4 — are attached at their radial bases to the tubular support 24, which, in turn, is anchored to the cover 11 of the hopper 9.

In FIG. 2, a vertical extruder has a main screw or impeller worm 25 to the upper part of which the spiral or helical impeller 23 is joined, for example, by welding. Also, the radial baffle walls 22 are fastened to a fixed tubular carrier support 24, into the end of which extends and is journaled the tapered tip 26 of screw 25. The tubular carrier support 24 is mounted on a cross frame 27, which, in turn, is held between the upper edge of he funnel segment 28 of the hopper and the lower edge of the upper part of the hopper 9.

The vertically disposed worm or screw 25 as represented in FIG. 2 extends downward, via sealing packings 29, out of the extruder barrel and into the gear box 30. The gears of gear box 30 are driven in a known manner by the drive motor 31, which can be, for example, a hydraulic motor.

Figure 3:
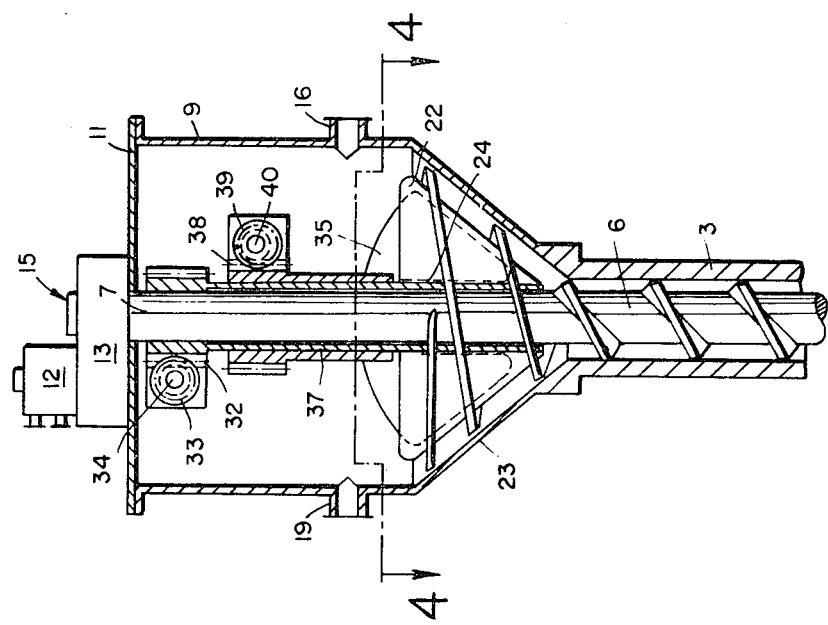
FIG. 3 is a longitudinal section through still another embodiment in which both the stationary walls or plates and also an expeller body or bodies are each individually vertically adjustable.

In FIG. 3, there is represented another embodiment of the invention. A vertical feed extruder 3 (cf., FIG. 1) is fed from hopper 9. The spiral or helical impeller 23 again is connected with the worm or screw 6 by welding. The worm or screw 6 has as its upper part the drive shaft 7, which extends upward through the hopper 9 into the gear box 13. The shaft 7 and its worm or screw 6, as well as the impeller 23, are vertically adjustable. The adjustment can be carried out from outside on the gear box 13 by the adjustment means 15. Hereby it is possible to vary the distance of the impeller 23 from the funnel or conical wall to the optimal value and to adapt it well to the particular material to be processed.

The embodiment of FIG. 3 makes it possible also to adjust at will the vertical position of the baffle members 22. For this, the baffle plates or walls are fastened to the tubular carrier support 24, which, in turn, surrounds the drive shaft 7. The vertical adjustability can be achieved, for example, by a toothed rack 32 on the upper end of the tubular support 24. A pinion 33 for rack 32 is attached to shaft 34 extending to the outside of hopper 9 and rotatable, for example, with the aid of a hand wheel (not shown).

The entry or screw feed performance of the combinations of the invention can be further significantly increased providing inside the spiral or helical impeller 23, between the baffle walls 22, expeller bodies 35, which are preferably likewise vertically adjustable. The expeller bodies 35 consist, for example, of plastic, light metal or the like, and likewise are adapted to the shape of the impeller 23. The expeller unit composed of the bodies 35 forms, in the case of funnellike or conical shape of the lower part of the hopper 9, a conical body with a rounded base such as is illustrated in FIG. 3. So that the expeller unit can move vertically independently of baffle members 22, it has, at least in the lower part, slots 36, which are best seen in FIG. 4. Into these slots extend the baffle members 22.

The expeller bodies 35 are mounted on a tubular carrier support 37 of its own, which, in turn, is axially shiftable on the tubular carrier beam 24. The axial shifting of this carrier support 37 is achieved by a toothed rack 38 attached to the upper end of this carrier support. The rack engages a pinion 39 which is mounted on a shaft 40. The shaft 40 extends, likewise vacuum tightly, out of the hopper and can be rotated outside the same, for example, by means of a hand wheel (not shown).

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

We claim:

1. A screw press particularly adapted for processing thermoplastic polymer particles having liquidlike flow characteristics and thermoplastic polymer melts, which comprises a feed hopper from the screw press, a vertical screw rotatable in a feed passage for conveying thermoplastic polymer particles or melt from said hopper to the feed portion of the screw of said screw press, at least one stationary radial baffle plate in the lower portion of said hopper, a spiral impeller and means for orbiting said impeller about said baffle plate in an annular space between the radially outer edge of said baffle plate and the wall of said hopper.

2. A screw press as claimed in claim 1, said lower portion of said hopper being a conical wall, the radially outer edge of said baffle plate being substantially parallel to and spaced from said conical wall, and the spiral of said impeller tapering in conformity with said conical wall.

3. A screw press as claimed in claim 1, and means fixedly joining said impeller with said vertical screw for rotation together.

4. A screw press as claimed in claim 1, a tubular support extending vertically axially through said hopper, and a plurality of said radial baffle plates mounted on said tubular support.

5. A screw press as claimed in claim 4, and a drive shaft for said vertical screw extending through said tubular support.

6. A screw press as claimed in claim 5, and means fixedly joining said impeller with said vertical screw for rotation together.

7. A screw press as claimed in claim 4, and means for raising and lowering said tubular support and the baffle plates mounted thereon.

8. A screw press as claimed in claim 1, characterized further by a plurality of said radial baffle plates in said lower portion, and expeller bodies between said radial plates for deflecting downwardly flowing polymer particles or melt radially outwardly into said annular space.

9. A screw press as claimed in claim 8, and means for raising and lowering said expeller bodies relative to said radial baffle plates.

10. A screw press as claimed in claim 1 wherein said hopper is a closed hopper, means for drawing a vacuum in said hopper, and pipe means for supplying said particles or melt to said hopper while it is under vacuum.

* * * * *